United States Patent [19]

Maly et al.

[11] 3,866,683

[45] Feb. 18, 1975

[54] METHOD FOR PLACING CEMENT IN A WELL

[75] Inventors: George P. Maly, Newport Beach; Paul W. Fischer, Whittier, both of Calif.

[73] Assignee: Union Oil Company of California, Los Angeles, Calif.

[22] Filed: Feb. 1, 1974

[21] Appl. No.: 438,526

[52] U.S. Cl. .............................. 166/292, 166/312
[51] Int. Cl. ............................................ E21b 33/13
[58] Field of Search ............ 166/285, 291, 292, 312

[56] References Cited
UNITED STATES PATENTS

| | | | |
|---|---|---|---|
| 2,104,488 | 1/1938 | Kennedy et al. | 166/292 |
| 2,219,325 | 10/1940 | Maness | 166/292 |
| 2,326,577 | 8/1943 | Teague et al. | 166/292 |
| 2,675,082 | 4/1954 | Hall | 166/312 |
| 2,742,090 | 4/1956 | Garrison | 166/292 |
| 2,811,206 | 10/1957 | Klotz | 166/285 |
| 2,848,051 | 8/1958 | Williams | 166/291 |
| 3,052,298 | 9/1962 | Malott | 166/312 |
| 3,227,213 | 1/1966 | Smith | 166/292 |
| 3,411,580 | 11/1968 | McKinney et al. | 166/285 |
| 3,467,193 | 9/1969 | Messenger | 166/292 |
| 3,557,876 | 1/1971 | Tragesser | 166/292 |
| 3,581,825 | 6/1971 | Messenger | 166/292 |
| 3,653,441 | 4/1972 | Tuttle | 166/291 |
| 3,791,448 | 2/1974 | Schuh | 166/291 |

*Primary Examiner*—Ernest R. Purser
*Assistant Examiner*—Jack E. Ebel

[57] ABSTRACT

The integrity and strength of cement placed in a well drilled with a drilling fluid containing an ingredient that deleteriously affects curing of the cement can be improved by (1) displacing the drilling fluid from the well with a highly gelled aqueous suspension of a hydrated clay that is substantially free of deleterious agents and that has a density at least equal to that of the drilling fluid, (2) introducing a cement slurry into the well, and (3) displacing the cement slurry to the proper location in the well with an additional quantity of highly gelled, aqueous hydrated clay suspension. The gelled preflush fluid can contain an abradant solid to facilitate the removal of the filter cake from the wall of the borehole. Also, filter cake removal can be facilitated by jetting the gelled preflush fluid against the borehole wall.

11 Claims, No Drawings

METHOD FOR PLACING CEMENT IN A WELL

This invention relates generally to the cementing of oil wells, and more specifically to the placement of cement in a well drilled with a drilling fluid containing constituents that deleteriously affect the setting of the cement.

Wells drilled into the earth for the production of oil and/or gas, or for the injection of water or gas into a permeable strata in an oil recovery operation, are conventionally completed by suspending a casing string in the well and cementing the casing string in place. Oftentimes, well drilling operations are then continued until a lower depth has been reached at which time a second string of well casing is positioned and cemented in the well. The drilling operation is continued until the target depth has been reached. Thus, the typical well drilled into a permeable subterranean formation may utilize one or more concentric casing strings extending from the surface to progressively lower depths.

The cementing of casing in oil wells is almost a universal practice and is done for a number of reasons, depending on the particular casing being cemented. Conductor casing must be cemented in order to prevent the drilling fluid from circulating outside of the casing thereby causing surface erosion. Surface casing must be cemented in order to seal off and protect fresh water formations, provide an anchor for blowout preventer equipment, and provide support for the deeper strings of casing. Intermediate casing strings are cemented in order to seal off high pressure formations, isolate incompetent formations which would cause excessive sloughing unless supported by casing and cement, and shut off zones of lost circulation in order to allow drilling to progress further. Oil strings are cemented in order to prevent migration of fluids to thief zones and sloughing which would cause a reduction in well productivity. Cement placed in the annulus between the wall of the borehole and the casing also protects the casing from corrosive fluids which may exist in the subsurface formations.

Each casing string placed in a well is cemented in place by means of a sheath of cement placed in the annulus surrounding the casing. This cement sheath is placed in the well by pumping a measured quantity of cement slurry down through the casing and upwardly through the annulus, the volume of cement being sufficient to fill the annulus to a known depth, which is usually at least to the bottom of the next outer casing string. The cement displaces the drilling fluid, or other fluid in the well, out of the casing and upwardly through the annulus, and is conventionally displaced into the well by drilling fluid or other fluid pumped into the casing following the cement. The well is then left undisturbed for a period of time sufficient for the cement to develop an initial set.

The cement placed in the annulus of a casing must provide a positive seal between the casing and the wall of the borehole, and must develop sufficient strength to avoid mechanical failure. The seal between the cement and the borehole wall is adversely affected by the filter cake deposited thereon during the drilling operation and by drilling fluid that adheres to the filter cake, and the seal between the cement and the outer surface of the casing is adversely affected by drilling fluid that adheres to it. Also, conventional drilling fluids contain various ingredients that affect the curing rate and ultimate mechanical strength of the cement. Compounds that are absorbed on the surface of the individual cement grains will retard the setting time of the cement. Many of the organic compounds used in drilling fluids, such as starches, chrome lignosulfonate, quebracho and sodium carboxymethyl cellulose, retard the setting time of the cement and result in a cured cement having lower mechanical strength. Chrome lignosulfonate, an important ingredient of most water base drilling fluids, is particularly detrimental to cement, and adversely affects the curing rate and ultimate mechanical strength of the cement.

Also, a plug of cement is sometimes placed in a borehole to provide a base for side track drilling. The cement plug must be sufficiently bonded to the borehole wall or the interior of the casing, as the case may be, and have sufficient mechanical strength to support the downward force exerted upon it during the side tracking operation.

Failure of the primary cementing of the casing in the well and other problems often require squeeze cementing of a well. Squeeze cementing is a method in which cement slurry is forced or "squeezed" by pressure into or against a permeable formation, or through perforations or casings or liners at predetermined locations, for the purpose of correcting such problems as high gas-oil ratios, excessive production of water, repair of casing leaks, sealing of perforations that are improperly placed, isolating producing zones prior to perforating for production, repairing channels and faults in the primary cement surrounding the casing, sealing low pressure zones that are thieving oil, gas, or drilling fluids, and on abandoning depleted producing zones to prevent fluid migration and contamination of other zones.

These cementing processes are adversely affected by contamination with drilling fluid that contains ingredients that deleteriously affect setting of the cement, and by the filter cake on the borehole wall. Various techniques have been employed for reducing contamination of the cement with drilling fluid, and for removing the filter cake from the wall of the borehole prior to cementing. In an attempt to reduce contamination of the cement with drilling fluid, cement is usually run with a plug immediately preceding the cement slurry and another plug immediately following the slurry. However, while this is an effective means of removing drilling fluid adhering to the inside surface of the casing and for preventing mixing of drilling fluid into the cement in the casing, it does not prevent mixing in the annulus after the cement exits the casing. Also, it has been proposed to displace drilling fluid from the well with a preflush of a viscous liquid such as water thickened with a cross-linked polysaccharide or a viscoelastic liquid such as an aqueous polyvinyl alcohol solution containing borate ions.

Efforts to remove the filter cake from the borehole wall have been concentrated mainly on the mechanical removal by scratchers or the like mounted on the exterior of the well casing. However, it has been proposed to abrade the filter cake by adding sand or other abradent substance to the cement slurry, or by jetting the cement slurry against the borehole wall with a special jetting tool so that the cementing material, of itself, acts as the medium to remove the filter cake.

However, for various reasons, these techniques have not been altogether effective in removing the filter cake from the formation face and in preventing contamination of the cement slurry with drilling fluid so as to assure a good, fluid-tight bonding of the cement to the wall of the borehole and to the exterior surface of the casing, and to assure that the cement possesses the designed curing rate and attains a high mechanical strength upon curing. Thus, need exists for an economical, simple method for placing cement in a well that achieves these results.

Accordingly, a principal object of this invention is to provide a method for placing cement in a well that has been drilled with a water base drilling fluid containing ingredients that deleteriously affect the curing of the cement.

Another object of the invention is to provide a method for cementing a casing in a well that provides a competent, high strength seal in the annulus surrounding the casing.

Still another object of the invention is to provide a method for cementing casings in wells drilled with a water base drilling fluid that contains constituents that deleteriously affect the cement.

A further object of the invention is to provide a method for cementing casings in wells drilled with a water base drilling fluid containing chrome lignosulfonate.

Briefly, this invention contemplates a method for placing cement in a well drilled with a drilling fluid containing an ingredient that deleteriously affects curing of the cement in which (1) the drilling fluid is displaced from the well with a highly gelled aqueous suspension of a hydrated clay that is substantially free of deleterious cement retarding agents and that has a density equal to or exceeding that of the drilling fluid, (2) a cement slurry is introduced into the well, and (3) the cement slurry is displaced to the proper location in the well with an additional quantity of a highly gelled, aqueous hydrated clay suspension. The gelled preflush suspension can contain an abradent solid to facilitate the removal of the filter cake from the wall of the bore hole. Also, filter cake removal can be facilitated by jetting the gelled preflush suspension against the borehole wall.

The gelled preflush fluid is a highly gelled suspension of a hydratable clay in fresh water, i.e., water having less than about 1 weight percent of dissolved salts. Upon being mixed into water, the hydratable clays form colloidal dispersions that exhibit increased viscosity and gel strength. It is well known that various clays of the bentonite, kaolin and hydrous mica groups exhibit these properties to varying degrees. Exemplary of the hydratable clays in the kaolin group are kaolinite, halloysite, dickite, nacrite, and endellite. The bentonite group includes montmorillonite, beidellite, nontronite, hectorite and saponite. Exemplary of the hydrous micas are bravaisite or illite. Finely ground bentonite is a particularly preferred hydratable clay for use in the gelled preflush fluid. Commercial bentonite is an earth material consisting principally of sodium montmorillonite.

The gelled preflush fluid is prepared by admixing sufficient hydratable clay in fresh water to provide, after complete hydration of the clay, a gelled fluid having a Fann viscosity above about 250 seconds and a yield value above about 35, and preferably about 40. Suitable gelled fluids can be prepared by admixing about 20 to 30 pounds of bentonite per 350 pounds of water, i.e., 20 to 30 pounds of bentonite per barrel of water. A finely ground, water-insoluble inorganic weighting material is added to the gelled preflush fluid to increase the density of the fluid to at least about equal to that of the drilling fluid that it will displace from the well, and preferably to a density about 2 pounds per cubic foot higher than that of the drilling fluid. Exemplary weighting materials include barite (principally strontium sulfate) iron oxide, silica flour and calcium carbonate, with barite and calcium carbonate being preferred weighting materials. The weighting materials are preferably ground to a fineness such that 90 percent will pass a 325-mesh screen and 95 percent through a 200-mesh screen. The amount of weighting material that must be added to increase the density of the desired amount in part depends upon the particular weighting material employed and the fluid density required. However, in many instances, the required fluid density can be obtained by the addition of 56 to 220 pounds of barites per barrel of gelled preflush fluid. The gelled preflush fluid should contain no ingredients such as chrome lignosulfonate, starch, sodium carboxymethyl cellulose, or the like, that adversely affect the curing rate or ultimate mechanical strength of the cured cement.

Also, an abradent material can be added to the gelled preflush fluid to enhance its drilling fluid and mud cake removal capability. Suitable abradent materials include sand, pumice, volcanic ash, flint, quartz, corundum, alundum, and tungsten carbide. It is preferred that the abradent material have a size within the range of about 10 mesh to 100 mesh, and that it be added to the gelled drilling fluid in an amount between about 3 to 20 pounds per barrel of gelled drilling fluid.

The cement slurry introduced into the well following the gelled preflush fluid can be any pumpable material that can be pumped into the well and which, upon placement therein, will set to sufficient hardness to accomplish the objectives of the cementing operation. The term "cement slurry" is intended to include hydraulic aqueous slurries of hydraulic and pozzolan cements. Exemplary hydraulic cements include Portland cement, either of the normal, high early strength, or slow setting types; mixtures of lime, silica and alumina; mixtures of lime, magnesia, silica, alumina or iron oxide; hydraulic limes, grapper cements; pozzolan cements, and natural cements. The pozzolan cements include a cement made from slaked lime and granulated blast furnace slag.

Most well cementing operations employ Portland cement meeting API specifications, and are introduced into the well as a neat slurry in which the weight ratio of water to cement is between about 0.25 and 0.65 (i.e., about 3 to 10 gallons of water per sack of cement).

Gelled preflush fluid can be employed as the displacing fluid used to displace the cement to the desired location in the well. However, it is preferred that the cement slurry be displaced with a highly gelled aqueous suspension of a hydrated clay, similar to that employed as the gelled preflush fluid, excepting that addition of the weighting material and the abradent material is not required or preferred. Also, as with the preflush fluid, the gelled displacing fluid should not contain constituents that adversely affect the curing rate or ultimate mechanical strength of the cured cement.

The above-mentioned Fann viscosity, gel strength and yield value of a gelled fluid can be measured by a Fann motor-driven viscosimeter as described in "Standard Procedure for Testing Drilling Fluids, Section 2, Viscosity and Gel Strength," *API RECOMMENDED PRACTICE*, American Petroleum Institute, API RP 13B, April, 1969, pages 5 and 6. The apparatus is operated at speeds of 300 and 600 rpm, and has an attachment for determining gel strength. The apparent viscosity in centipoises equals the 600 rpm reading divided by 2, and the plastic viscosity in centipoises equals the 600 rpm reading minus the 300 rpm reading. Gel strengths in pounds per 100 square feet are determined with the Fann motor-driven viscosimeter by use of a special attachment, and are measured immediately after stirring and after a 10-minute quiescent period. These values are reported as the initial and 10-minute gel strengths. The yield value is a measure of that part of flow resistance arising from attractive forces between the solid particles in the fluid. Yield value in pounds per 100 square feet equals the 300 rpm reading on the Fann motor-driven viscosimeter minus the plastic viscosity.

In the practice of the cementing method of this invention, the gelled preflush fluid is pumped into the well in an amount at least sufficient to displace the drilling fluid, or other fluid in the well from the zone to be cemented. Next, the cement slurry is introduced into the well in an amount calculated to fill the space to be cemented, and the cement slurry displaced to the desired location with an additional measured volume of highly gelled displacing fluid. The displacing fluid effectively removes drilling fluid from the zone to be cemented and at least partly removes the filter cake from the borehole wall in the zone that it contacts. Filter cake removal is promoted by jetting the gelled displacing fluid at high velocity against the wall of the borehole in the zone to be cemented. Jetting can be effected either by pumping the gelled fluid through the drill pipe and outwardly through the orifices in the bit while the drill string is slowly pulled from the well, or by means of a washing sub run into the well on drill pipe.

In a preferred mode of practicing the invention, the gelled preflush fluid is injected into the well in an amount equivalent to the volume of cement to be placed, and more preferably the gelled preflush can be circulated through the well until the fluid returns are free of drilling fluid and dislodged particles of the filter cake.

Also, it is preferred that the preflush fluid be pumped into the well at a volume flow rate sufficiently high that turbulent flow is obtained in both the inlet conduit and the annulus so that maximum mixing of the gelled preflush fluid and a high degree of displacement of the drilling fluid from the pipe surfaces and the borehole wall are obtained, and at least the outer portion of the filter cake is effectively removed to enhance bonding of the subsequently placed cement.

The cementing method of this invention can be employed to cement casing in the well. In this mode of practicing the invention, the gelled preflush fluid is pumped into the well through the drill pipe and returned up the annulus at a sufficiently high volume flow rate to obtain turbulent flow in both the drill pipe and in the annulus. As an optional step, the drill pipe can be pulled slowly from the well while pumping the gelled preflush fluid so as to jet the preflush fluid against the borehole wall in the zone to be cemented to facilitate removal of the filter cake. The drill string is then pulled from the well and the casing run in conventional manner. Thereafter, it is preferred to fluid the casing and annulus with an additional volume of gelled preflush fluid, preferably an amount at least about equal to the volume of cement to be placed. Next, a measured volume of cement slurry is pumped into the casing followed by sufficient gelled displacing fluid to displace the cement to the zone to be cemented. Operations are than suspended for a period of time for the cement to obtain an initial set.

A cement plug can be set in a well for side track drilling or other operations by first pumping gelled preflush fluid into the well to displace the drilling fluid from the zone in which the plug is to be set. Preferably, the gelled preflush fluid is jetted against the borehole wall in the zone to be cemented to remove the filter cake therefrom. Where the cement plug is to be placed at an intermediate location in the well, a cement retainer is set and the cement introduced into the well and displaced to the location of the plug with gelled displacing fluid. The cement is allowed to set, and after sufficient strength has been obtained, the side track drilling or other operation can be conducted in conventional manner.

A squeeze cementing operation employing the method of this invention is conducted in conventional manner excepting that the squeeze operation is preceded by the step of displacing the drilling fluid from the zone to be cemented with gelled preflush fluid, and by displacing the cement slurry into the well with gelled displacing fluid.

The cementing method of this invention is further demonstrated by the following examples which are presented by way of illustration, and are not intended as limiting the spirit and scope of the invention as defined by the appended claims.

EXAMPLE 1

A well is drilled in conventional manner using a rotary drilling rig. A drilling mud having the following composition is employed:

|  | Pounds/Barrel |
| --- | --- |
| Bentonite | 33.6 |
| Clay and Cuttings | 78.4 |
| Chrome lignosulfonate | 22.4 |
| Lignite | 11.2 |
| Caustic | To obtain a pH of 9.5 |
| Carboxymethyl Cellulose | 2.8 |
| Water | 350.0 |

This drilling mud exhibited a density of 75 pounds per cubic foot.

Upon completion of the drilling operation a gelled clay suspension is prepared by admixing bentonite into fresh water in the proportion of 25 pounds of bentonite per barrel of water and allowing the clay to hydrate. Barite is then added to a portion of the gelled clay suspension to increase the density to about 77 pounds per cubic foot. The weighted gel exhibits a Fann viscosity of about 270 seconds and a yield value of about 40. Casing is run and set in conventional manner and the weighted preflush fluid circulated down the casing and up the annulus until clean returns are obtained. Cement slurry is then run and placed in conventional manner using a measured volume of the unweighted, gelled clay suspension to displace the cement slurry down the casing.

EXAMPLE 2

A casing is cemented in a borehole substantially as described in Example 1 excepting that the weighted preflush fluid is pumped down the drill pipe at the conclusion of the drilling operation and jetted through the bit so as to impinge against the borehole wall while slowly withdrawing the drill pipe from the borehole.

EXAMPLE 3

A casing is cemented in a borehole substantially as described in Example 1 excepting that about 10 pounds per barrel of 20 to 40 mesh sand is added to the weighted preflush fluid to increase its abrasiveness.

Various embodiments and modifications of this invention have been described in the foregoing description and examples, and further modifications will be apparent to those skilled in the art. Such modifications are included within the scope of this invention as defined by the following claims.

Having now described the invention, we claim:

1. A method for placing cement in a well drilled with a drilling mud containing agents that deleteriously affect the setting of the cement, which comprises:

displacing the drilling mud from the well with a preflush fluid comprising a highly gelled aqueous suspension of a hydrated clay that is substantially free of the deleterious cement retarding agents and that has a density at least equal to that of the drilling mud;

pumping a cement slurry into the well;

displacing the cement slurry to a desired location in the well with a displacing fluid comprising a highly gelled aqueous suspension of a hydrated clay that is substantially free of the deleterious cement retarding agents; and permitting said cement to set in said well.

2. The method defined in claim 1 wherein said preflush fluid exhibits a Fann viscosity of at least about 250 seconds and a yield above about 40.

3. The method defined in claim 1 wherein said hydratable clay is bentonite.

4. The method defined in claim 1 wherein said preflush fluid also contains a weighting agent to increase the density of said fluid.

5. The method defined in claim 4 wherein said weighting agent is selected from the group consisting of barites and calcium carbonate.

6. The method defined in claim 1 wherein said preflush fluid also contains an abrasive solid material.

7. The method defined in claim 1 wherein a stream of said preflush fluid is jetted against the wall of said well to remove the mud cake therefrom.

8. A method for placing cement in a well drilled with a drilling mud containing agents that deleteriously affect the setting of the cement, which comprises:

displacing the drilling mud from the well with a preflush fluid comprising a highly gelled aqueous suspension of bentonite that is substantially free of deleterious cement retarding agents and that contains a weighting material in an amount sufficient to increase the density of said fluid to at least equal to that of the drilling mud, said preflush fluid exhibiting a Fann viscosity of at least about 250 seconds and a yield above about 35;

pumping a cement slurry to the well;

displacing the cement slurry to a desired location in the well with a displacing fluid comprising a highly gelled aqueous suspension of bentonite that is substantially free of the deleterious cement retarding agents; and permitting said cement to set in said well.

9. The method defined in claim 8 wherein said weighting agent is selected from the group consisting of barites and calcium carbonate.

10. The method defined in claim 8 wherein said preflush fluid contains an abrasive solid material.

11. The method defined in claim 8 wherein a stream of said preflush fluid is jetted against the wall of said well to remove the mud cake therefrom.

* * * * *